United States Patent
Wang et al.

(10) Patent No.: US 9,330,570 B2
(45) Date of Patent: May 3, 2016

(54) IMAGE ASSISTED PARKING SPACE AVAILABILITY SEARCHING AND RESERVATION METHOD AND SYSTEM

(71) Applicant: Xerox Corporation, Norwalk, CT (US)

(72) Inventors: Yao Rong Wang, Webster, NY (US); David Cummins, Washington, DC (US); Mathew Darst, Chicago, IL (US); Panya Chanawangsa, Williamsville, NY (US); Orhan Bulan, Ankara (TR)

(73) Assignee: Xerox Corporation, Norwalk, CT (US)

(*) Notice: Subject to any disclaimer, the term of this patent is extended or adjusted under 35 U.S.C. 154(b) by 187 days.

(21) Appl. No.: 13/935,605

(22) Filed: Jul. 5, 2013

(65) Prior Publication Data
US 2015/0009048 A1     Jan. 8, 2015

(51) Int. Cl.
*G08G 1/14*     (2006.01)
*G06Q 10/02*    (2012.01)

(52) U.S. Cl.
CPC .............. *G08G 1/147* (2013.01); *G06Q 10/02* (2013.01); *G08G 1/144* (2013.01)

(58) Field of Classification Search
CPC .......... G08G 1/14; G08G 1/144; G08G 1/47; G08G 1/0969; G01C 21/00; G06Q 50/10; G06Q 10/02; G06Q 10/025; G06Q 30/02; G06Q 30/0601; G06Q 30/06
USPC .......... 340/932.2, 933, 937, 905, 994, 995.1, 340/995.24, 539.1, 539.11; 705/5, 13, 40, 705/423, 454; 235/384; 348/148, 104
See application file for complete search history.

(56) References Cited

U.S. PATENT DOCUMENTS

| | | |
|---|---|---|
| 6,285,297 B1 | 9/2001 | Ball |
| 6,340,935 B1 | 1/2002 | Hall |
| 6,559,776 B2 | 5/2003 | Katz |
| 7,391,339 B2 | 6/2008 | Howard et al. |
| 7,936,284 B2 | 5/2011 | Levine et al. |
| 7,950,570 B2 | 5/2011 | Marchasin et al. |
| 8,219,442 B2 | 7/2012 | Johnson et al. |
| 8,274,403 B2 | 9/2012 | Groft |
| 2010/0191584 A1 | 7/2010 | Fraser et al. |
| 2011/0015972 A1 | 1/2011 | Valdecantos Pardo de Santayana et al. |
| 2012/0007983 A1 | 1/2012 | Welch |
| 2012/0050069 A1 | 3/2012 | Mercier et al. |

(Continued)

OTHER PUBLICATIONS

ParkMe—The App, http://www.parkme.com/parkingapp, printed May 20, 2013, 2 pages.

(Continued)

*Primary Examiner* — Anh V La
(74) *Attorney, Agent, or Firm* — Kevin Soules; Kermit D. Lopez; Luis M. Ortiz (57) ABSTRACT

An image assisted parking space availability searching and reservation method and system. An image capturing unit can be deployed onsite (e.g., parking lot, street side parking, etc.) to monitor parking spaces/spots. A parking space detection and reservation module can be configured in association with a mobile communications device to assist in the detection and selection of particular spaces. A destination street(s) can be located via a web browser installed associated with the mobile communications device. An IP address of the image-capturing unit monitoring the parking space can be obtained and a snapshot image/video of the street can be displayed. The captured video can be processed in real-time to report parking availability with respect to the street(s) and a parking space reserved.

20 Claims, 8 Drawing Sheets

(56) References Cited

U.S. PATENT DOCUMENTS

| | | | |
|---|---|---|---|
| 2012/0092190 A1 | 4/2012 | Stefik et al. | |
| 2012/0095791 A1 | 4/2012 | Stefik et al. | |
| 2012/0095792 A1 | 4/2012 | Stefik et al. | |
| 2012/0095812 A1 | 4/2012 | Stefik et al. | |
| 2012/0133770 A1* | 5/2012 | Joao | G01C 21/3691 348/149 |
| 2012/0265434 A1* | 10/2012 | Woodard et al. | 701/423 |
| 2012/0284146 A1 | 11/2012 | Wong | |
| 2012/0286972 A1 | 11/2012 | Bouzaglo | |
| 2012/0296708 A1 | 11/2012 | Bachmann et al. | |
| 2012/0310712 A1 | 12/2012 | Baughman et al. | |
| 2014/0176348 A1* | 6/2014 | Acker et al. | 340/932.2 |
| 2014/0313058 A1* | 10/2014 | Chen et al. | 340/932.2 |
| 2014/0350855 A1* | 11/2014 | Vishnuvajhala | 701/538 |

OTHER PUBLICATIONS

Roush, W., "Streetline Unveils iPhone Parking App, Seeks to Take Guesswork out of Finding a Spot," Xxonomy.com, http://www.xconomy.com/san-francisco/2010/12/22/streetline-unveils-parking-app-seeks-to-take-guesswork-out-of-finding-a-spot/, printed May 10, 2013, 4 pages.

StreetSmart Technology, LLC, http://streetsmarttechnology.com/, printed May 10, 2013, 2 pages.

Ultrasonic Parking Sensor, Alibaba.com, printed May 10, 2013, 4 pages.

* cited by examiner

IMAGE ASSISTED PARKING SPACE AVAILABILITY SEARCHING AND RESERVATION METHOD AND SYSTEM

FIELD OF THE INVENTION

Embodiments are generally related to the field of parking management. Embodiments are also related to techniques for assisting users in finding available parking spaces and applications thereof. Embodiments are additionally related to image assisted parking space availability searching and reservation.

BACKGROUND

A balance between supply and demand must be determined to meet the parking requirements of motorists. The ability to efficiently allocate and manage on-street parking remains elusive, even when parking requirements are significant, recurring, and known ahead of time. For instance, urban parking spaces characteristically undergo periods of widely skewed demand and utilization, with low demand and light use in some periods, often during the night, and heavy demand and use at other times. Real-time parking occupancy detection systems are an emerging technology in parking management.

Figure 1:
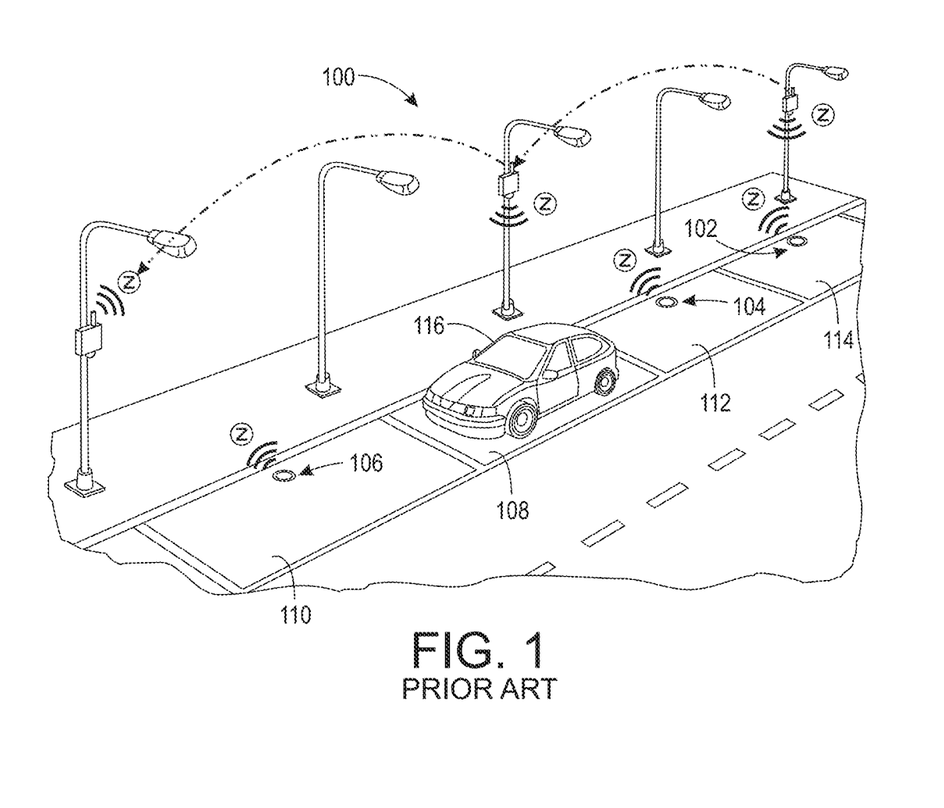
FIG. 1 illustrates a prior art parking occupancy detection system based on a puck-style sensor.

Some prior art parking occupancy detection approaches utilize a puck-style sensor configuration that outputs a binary signal when detecting a vehicle in, for example, a parking stall or a particular parking spot. FIG. 1, for example, illustrates respective parking occupancy detection systems 100 for parking occupancy detection in an on-street parking. In the example depicted in FIG. 1, system 100 includes one or more puck-style in-ground sensors 102, 104, 106. Also depicted in FIG. 1 are example parking spaces 110, 108, 112, 114. A vehicle 116 is shown parked in parking space 108 in FIG. 1. It can be assumed that the sensor 104 located closest to the parking space 108 can be employed in the detection of vehicle 116 located in parking spot 108. In the example shown in FIG. 1, the sensors 102, 104, and 106 can provide real-time data in order to aid drivers searching for the parking spots and to reduce traffic congestion in cities due to drivers circling about parking lots in a wasteful and time consuming effort to find parking spots.

On-street/curbside parking space reservation systems have also been proposed based on inputs from in-ground sensors. Such prior art parking space management and reservation systems are based on the use of binary sensor input data for determining parking spot availability only. Hence, customers are unable to preview the parking space before making a reservation or arriving at the desired parking spot.

Figure 2:
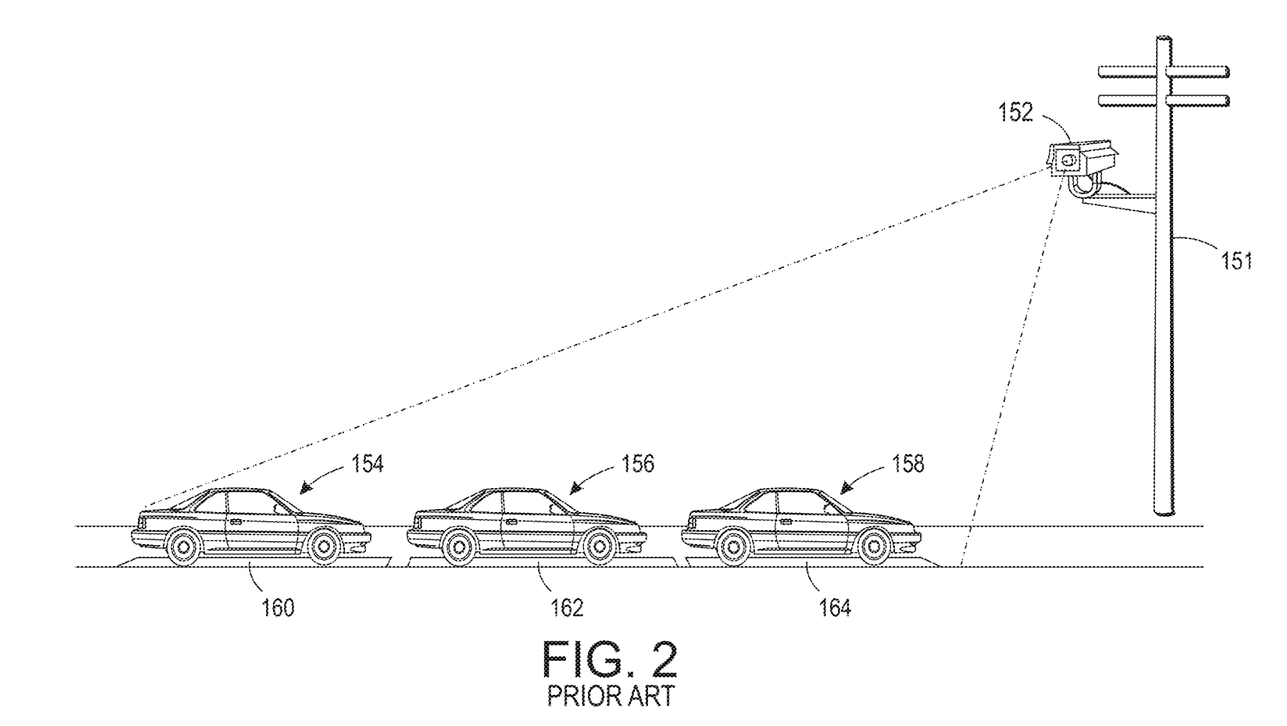
FIG. 2 illustrates a prior art video-based parking occupancy detection system with an image capturing unit.

Video-based parking occupancy detection systems, an example of which is shown in FIG. 2, are a recently developed technology. The example video-based parking occupancy detection system shown in FIG. 2 generally includes an image-capturing unit 152 (e.g., a video camera) mounted on, for example, a pole 151. The image-capturing unit 152 monitors within its field of view one or more vehicles 154, 156, 158 respectively parked in parking spaces 160, 162, 164. This new technology is capable of not only providing binary parking occupancy data of a street, but also sending an image indicating the current parking state of the street.

Based on the foregoing, it is believed that a need exists for an image assisted parking space availability searching and reservation system and method, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods and systems.

It is another aspect of the disclosed embodiments to provide for improved parking space availability searching techniques.

It is yet another aspect of the disclosed embodiments to provide for an improved image assisted parking space availability searching and reservation method and system.

The aforementioned aspects and other objectives and advantages can now be achieved as described herein. Image assisted parking space availability searching and reservation methods and systems are disclosed herein. An image capturing unit can be deployed on site to monitor one or more parking spots, and a parking space detection and reservation module can be configured and employed in association with a mobile communications device or a vehicle on-board wireless communication device. A destination street(s) can be located and identified via a web browser installed on the mobile communications device. An IP address associated with the image-capturing unit monitoring the parking spot(s) can be obtained and a user can display a snapshot image/video of the street via the mobile communications device upon request. The captured video can be processed in real-time to report parking availability with respect to the street(s) and a parking space/drive can be reserved to the destination to park by the user.

Such an approach displays the traffic condition on the street and the parking environment in real time and at the moment before the user drives to the parking space. The parking space availability searching module displays the parking availability with respect to the street(s) on the mobile communication device. The space availability and surrounding area can be inspected prior to reserving or traveling to the parking spot by the user. The user can remotely and visually examine the parking spot for desirability, location, and surrounding environment to enable higher customer satisfaction. Such an approach can, for example, provide information to the user/driver prior to the driver committing to or driving to the potential parking space.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
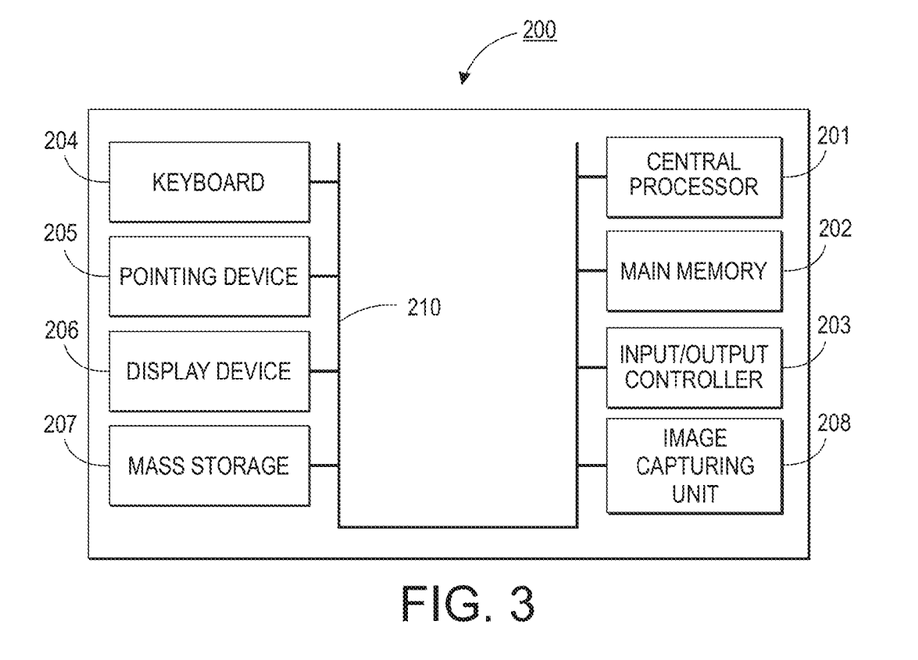
FIG. 3 illustrates a schematic view of a computer system, in accordance with the disclosed embodiments.
Figure 4:
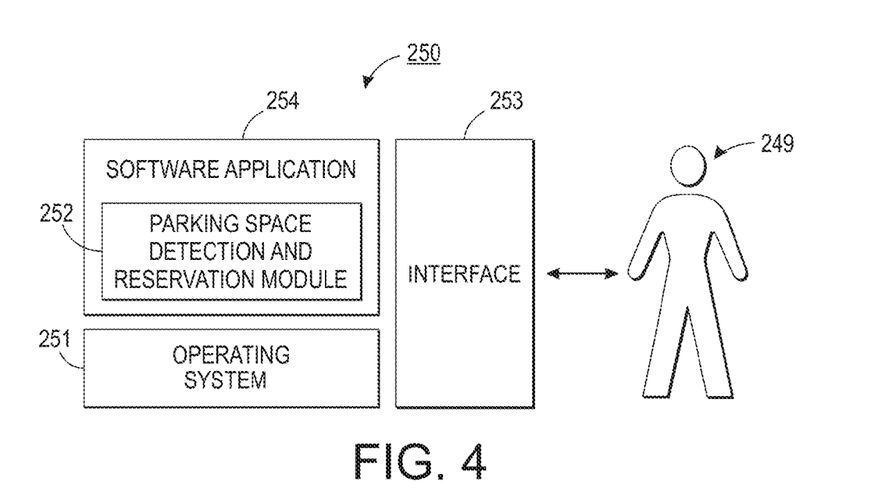
FIG. 4 illustrates a schematic view of a software system including a video-based parking space detection and reservation module, an operating system, and a user interface, in accordance with the disclosed embodiments.

FIGS. 3-4 are provided as exemplary diagrams of data-processing environments in which embodiments of the present invention may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, the disclosed embodiments may be implemented in the context of a data-processing system 200 that includes, for example, a central processor 201, a main memory 202, an input/output controller 203, a keyboard 204, an input device 205 (e.g., a pointing device such as a mouse, track ball, pen device, etc.), a display device 206, a mass storage 207 (e.g., a hard disk), and an image capturing unit 208. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 4 illustrates a computer software system 250 for directing the operation of the data-processing system 200 depicted in FIG. 3. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; These inputs may then be acted upon by the data-processing system 200 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "windows" system. It can be appreciated, of course, that other types of systems are possible. For example, rather than a traditional "windows" system, other operating systems such as, for example, a real time operating system (RTOS) more commonly employed in wireless systems may also be employed with respect to operating system 251 and interface 253. The software application 254 can include, for example, a video-based on-street parking space detection and reservation module 252 for detecting and reserving on-street parking space. The parking space estimation and reservation module 252 can include instructions such as those described at blocks 402, 404, 406, 408 of method 401 shown in FIG. 6 and blocks 410, 412, 414, 416 of method 403 shown in FIG. 7.

FIGS. 3-4 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 5:
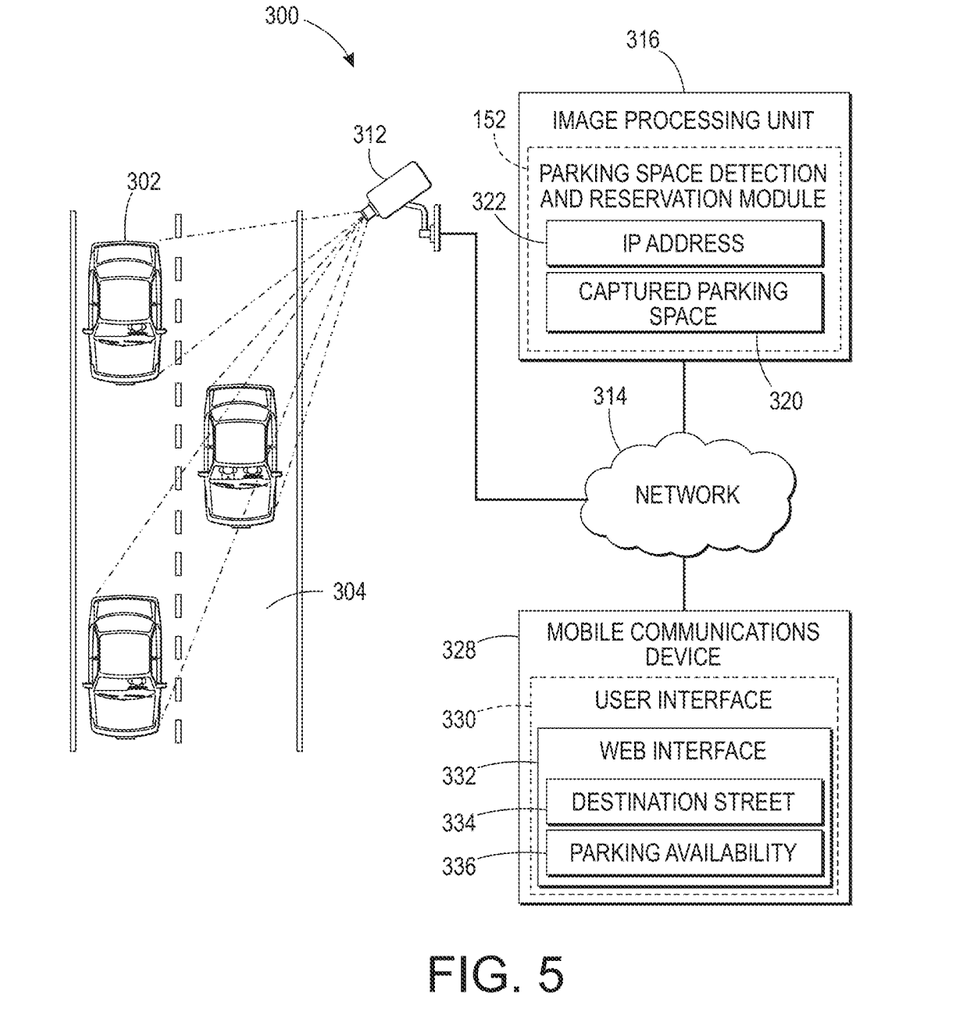
FIG. 5 illustrates a block diagram of an image assisted parking space detection and reservation system, in accordance with the disclosed embodiments.

FIG. 5 illustrates a block diagram of a video-based on-street parking space detection and reservation system 300, in accordance with the disclosed embodiments. Note that in FIG. 1-7, identical or similar blocks are generally indicated by identical reference numerals. The video-based on-street parking space detection and reservation system 300 generally includes an image capturing unit 312 (e.g., camera) for capturing an image of a vehicle 302 and parking space 304 within an effective field of view. The image capturing unit 312 can be deployed on site to monitor a parking spot.

The vehicle 302 can be, for example, automobiles, cars, trucks, vans, buses, motorhomes, tankers, motorcycles, or other vehicles, etc., as well as trailers of all kinds in-tow. The image capturing unit 312 can be operatively connected to an image processing unit 316 via a network 314. Note that the image capturing unit 312 described in greater detail herein is analogous or similar to the image capturing unit 208 of the data-processing system 200 depicted in FIG. 3. The image capturing unit 312 may include built-in integrated functions such as image processing, data formatting, and data compression functions. Also, the unit 312 includes imager-positioning, range-finding, and a flash bulb.

Note that the network 314 may employ any network topology, transmission medium, or network protocol. The network 314 may include connections such as wire, wireless communication links, or fiber optic cables. Network 314 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The image capturing unit 312 integrated with the image processing unit 316 continuously monitors surrounding traffic and parking space within an effective field of view. The image processing unit 316 receives a captured image from the image capturing unit 312 in order to process the image/video. The image processing unit 316 is preferably a small, handheld computer device or palmtop computer as depicted in FIG. 3 that provides portability and is adapted for easy mounting. The parking space detection and reservation module 152 associated with the image processing unit 316 can be configured in association with a mobile communications device 328.

A destination street(s) 334 can be located by a web browser 332 installed on the mobile communications device 328. The parking space detection and reservation module 152 obtains an IP address 322 of the image capturing unit 312 monitoring the parking spot and displays a snapshot image/video of the street on the mobile communications device 328 upon request by a user. The parking space detection and reservation module 152 processes the captured video in real-time to report parking availability with respect to the street(s) and reserves a parking space/drive 320 to the destination to park by the user. The system 300 displays the traffic condition on the street and the parking environment in real time and at the moment before the user drives to the parking space.

Figure 6:
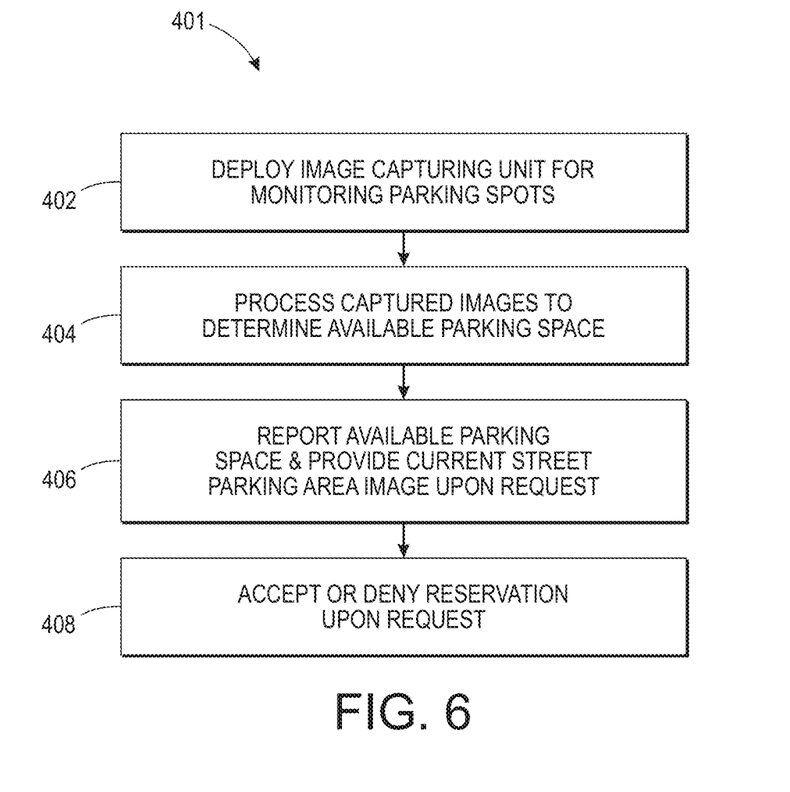
FIG. 6 illustrates a high level flow chart of operations illustrating logical operational steps of a method for detecting and reserving a parking space, including image-capturing and processing, in accordance with the disclosed embodiments.
Figure 7:
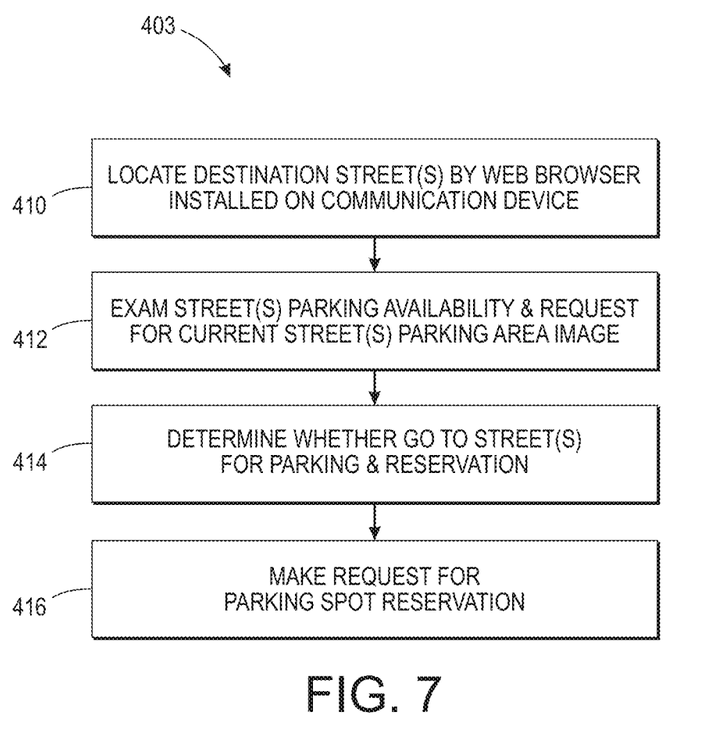
FIG. 7 illustrates a high-level flow chart of operations depicting logical operational steps of a method for image-assisted parking space availability searching and reservation request and implementation via a user communication device, in accordance with the disclosed embodiments.

FIG. 6 illustrates a high level flow chart of operations illustrating logical operational steps of a method 401 for detecting and reserving a parking space, including image-capturing and processing, in accordance with the disclosed embodiments. FIG. 7 illustrates a high-level flow chart of operations depicting logical operational steps of a method 403 for image-assisted parking space availability searching and reservation request and implementation via a user communication device, in accordance with the disclosed embodiments. The methods 401, 403 respectively depicted in FIG. 6-7 thus represent a continuation of the same process.

As shown at block 402, an operation can be implemented to deploy an image capturing unit (e.g., image capturing unit 312) for monitoring parking spots. Next, as indicated at block 404, an operation can be implemented to process captured images (i.e., images captured by the image capturing unit) to determine one or more available parking spaces. Then, as shown at block 406, an operation can be implemented to report available parking space(s) and provide current street parking area image(s) upon request. Thereafter, as described at block 408, an operation can be implemented to accept or deny a reservation upon request.

As shown at block 410 in FIG. 7, a destination street(s) can be located via a web browser installed on a communication device (e.g., Smartphone, pad computing device, laptop computer, desktop computer, etc.). Street(s) parking availability can be examined and a request can be made to view a current street(s) parking area image, as shown at block 412. Next, an operation can be implemented to determine whether to go to the street(s) for parking and reservation, as depicted at block 414. Then, as shown at block 416, a request can be made via the communication device for a parking spot reservation.

Figure 8:
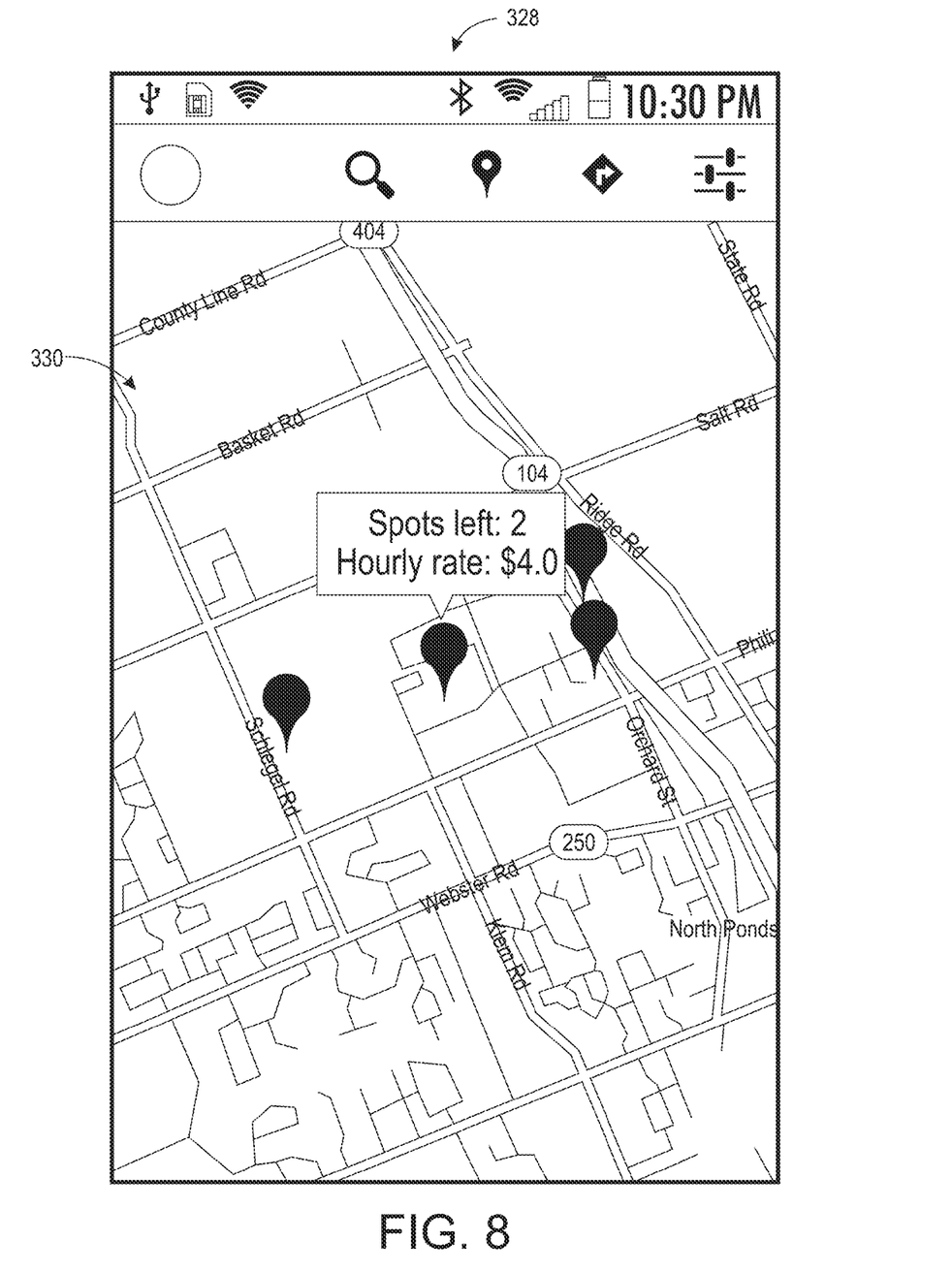
FIG. 8 illustrates a user interface of a mobile communications device displaying a parking space and graphics/maps thereof, in accordance with an embodiment.
Figure 9:
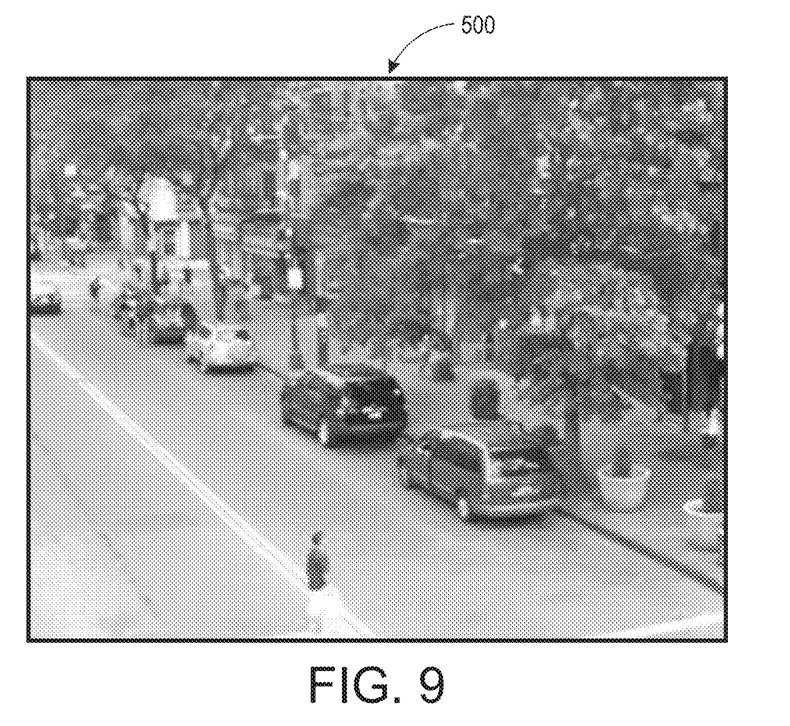
FIG. 9 illustrates a street view image that can be provided by a video-based parking occupancy detection system and displayed on a user interface of a mobile communication device, in accordance with an embodiment.

FIG. 8 illustrates an example user interface 330 associated with a mobile communications device 328 displaying a graphical parking space image/map, in accordance with an embodiment. The parking space detection module 152, for example, can process instructions for displaying the parking availability 320 with respect to the street(s) on the mobile communications device 328. FIG. 9 illustrates an example street view image 500 that can be provided by, for example, the video-based parking occupancy detection system 300 shown in FIG. 5 and displayed via user interface 330 of mobile communications device 328, in accordance with an example embodiment.

As shown in FIG. 8, space availability 2 and surrounding area can be inspected prior to reserving or traveling to the parking spot by the user. For example, by clicking on the availability "rain drop" icon, the example image 500 shown in FIG. 9 can be displayed on user's communication device 328. The user can remotely and visually examine the parking spot for desirability, location, and surrounding environment prior to driving or reserving the parking spot to enable higher customer satisfaction. Such an approach provides information to the customer prior to committing or driving to the space and further protects parking technologies involving camera sourced data and use of the data.

Based on the foregoing, it can be appreciated that a number of embodiments, preferred and alternative, are disclosed herein. For example, in one embodiment, a method is disclosed for searching and reserving an available parking space. Such a method can include the steps or logical operations of, for example, locating a destination street via a web browser associated with a mobile communications device or a vehicle on-board wireless communication device to thereafter obtain an Internet protocol address of an image-capturing unit monitoring one or more parking spaces; and displaying an image of the destination street via the communications device upon a particular request the image captured by the image-capturing unit.

In another embodiment, a step or logical operation can be implemented for capturing and processing the image in real-time to report parking availability with respect to the destination street. In yet another embodiment, a step or logical operation can be implemented for reserving a parking space based on the parking availability. In still another embodiment, a step or logical operation can be implemented for displaying in real-time via the mobile communications device a traffic condition associated with the destination street and a parking environment thereof.

In another embodiment, a step or logical operation can be implemented for remotely inspecting the parking space availability and surrounding area via the web browser prior to reserving and traveling to the parking space(s). In yet another embodiment, a step or logical operation can be implemented for remotely and visually examining via the communications device the parking spot(s) for desirability, location, and a surrounding environment thereof to enhance customer satisfaction. In still another embodiment, the image-capturing unit can be deployed with respect to the parking(s) space and for monitoring the parking space(s).

In another embodiment, a system for searching and reserving an available parking space can be implemented. Such a system can include, for example, a processor, and a computer-usable medium embodying computer program code, the computer-usable medium capable of communicating with the processor. The computer program code can include instructions executable by the processor and configured, for example, for locating a destination street via a web browser associated with a mobile communications device or a vehicle on-board wireless communication device to thereafter obtain an Internet protocol address of an image-capturing unit monitoring one or more parking spaces; and displaying an image of the destination street via the communications device upon a particular request the image captured by the image-capturing unit.

In another embodiment, such instructions can be further configured for capturing and processing the image in real-time to report parking availability with respect to the destination street. In still another embodiment, such instructions can be further configured for reserving a parking space based on the parking availability. In yet another embodiment, such instructions can be further configured for displaying in real-time via the mobile communications device a traffic condition associated with the destination street and a parking environment thereof.

In still another embodiment, such instructions can be further configured for remotely inspecting the parking space availability and surrounding area via the web browser prior to reserving and traveling to the parking space(s). In another embodiment, such instructions can be further configured for remotely and visually examining via the communications device the parking space(s) for desirability, location, and a surrounding environment thereof to enhance customer satisfaction. In another embodiment, the image-capturing unit can be deployed with respect to the parking space (or spaces) and for monitoring the parking space (or spaces).

In another embodiment, a processor-readable medium can be provided storing code representing instructions to cause a process for searching and reserving an available parking space. Such code can include code to, for example, locate a destination street via a web browser associated with a mobile communications device or a vehicle on-board wireless communication device to thereafter obtain an Internet protocol address of an image-capturing unit monitoring one or more parking spaces; and display an image of the destination street via the communications device upon a particular request the image captured by the image-capturing unit.

In another embodiment, such code can include code to capture and process the image in real-time to report parking availability with respect to the destination street. In another embodiment, such code can include code to reserve a parking space based on the parking availability. In another embodiment, such code can include code to display in real-time via the mobile communications device a traffic condition associated with the destination street and a parking environment thereof. In another embodiment, such code can include code to remotely inspect the parking space availability and surrounding area via the web browser prior to reserving and traveling to the parking space(s). In another embodiment, such code can include code to remotely and visually examine via the communications device the parking space(s) for desirability, location, and a surrounding environment thereof to enhance customer satisfaction.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art which are also intended to be encompassed by the following claims.

The invention claimed is:

1. A method for searching and reserving an available parking space, said method comprising:
    locating a destination street via a web browser associated with a mobile communications device or a vehicle on-board wireless communication device to thereafter obtain an Internet protocol address of an image-capturing unit monitoring at least one parking space; and
    displaying a pictorial or video image of said destination street via said communications device upon a particular request, said image captured by said image-capturing unit.

2. The method of claim 1, further comprising capturing and processing said pictorial or video image in real-time to report parking availability with respect to said destination street.

3. The method of claim 2 further comprising reserving a parking space based on said parking availability.

4. The method of claim 1 further comprising displaying in real-time via said mobile communications device, a traffic condition associated with said destination street and a parking environment thereof.

5. The method of claim 1, further comprising remotely inspecting said parking space availability of a surrounding area via said pictorial or video images and said web browser prior to reserving and traveling to said at least one parking space.

6. The method of claim 1, further comprising enabling remotely and visually examining of said pictorial or video images via said communications device, said at least one parking space for desirability, location, and a surrounding environment thereof to enhance customer satisfaction.

7. The method of claim 2, wherein said image-capturing unit is deployed with respect to said at least one parking space for monitoring and capturing said pictorial or video images of said destination street and said at least one parking space.

8. A system for searching and reserving an available parking space, said system comprising:
    a processor; and
    a computer-usable medium embodying computer program code, said computer-usable medium capable of communicating with the processor, said computer program code comprising instructions executable by said processor and configured for:
    locating a destination street via a web browser associated with a mobile communications device or a vehicle on-board wireless communication device to thereafter obtain an Internet protocol address of an image-capturing unit monitoring at least one parking space; and
    displaying a pictorial or video image of said destination street via said communications device upon a particular request, said pictorial or video image captured by said image-capturing unit.

9. The system of claim 8, wherein said instructions are further configured for capturing and processing said pictorial or video image in real-time to report parking availability with respect to said destination street.

10. The system of claim 9 wherein said instructions are further configured for reserving a parking space based on said parking availability.

11. The system of claim 8 wherein said instructions are further configured for displaying in real-time via said mobile communications device, a traffic condition associated with said destination street and a parking environment thereof.

12. The system of claim 8 wherein said instructions are further configured for remotely inspecting said parking space availability of a surrounding area via said web browser prior to reserving and traveling to said at least one parking space.

13. The system of claim 8, wherein said instructions further configured with said pictorial or video image are for remotely and visually examining via said communications device, said at least one parking space for desirability, location, and a surrounding environment thereof to enhance customer satisfaction.

14. The system of claim 9, wherein said image-capturing unit is deployed with respect to said at least one parking space for visually monitoring said at least one parking space.

15. A processor-readable medium storing code representing instructions to cause a process for searching and reserving an available parking space, said code comprising code to:
    locate a destination street via a web browser associated with a mobile communications device or a vehicle on-board wireless communication device to thereafter obtain an Internet protocol address of an image-capturing unit monitoring and capturing pictorial or video images of at least one parking space located along a destination street; and
    display a pictorial or video image of said destination street via said communications device upon a particular request, said pictorial or video image captured by said image-capturing unit.

16. The processor-readable medium of claim 15, wherein said code further comprises code to capture and process said pictorial or video image in real-time to report parking availability with respect to said destination street.

17. The processor-readable medium of claim 16 wherein said code further comprises code to reserve a parking space based on said parking availability.

18. The processor-readable medium of claim 15 wherein said code further comprises code to display in real-time via said mobile communications device, a traffic condition associated with said destination street and a parking environment thereof.

19. The processor-readable medium of claim 15 wherein said code further comprises code to remotely inspect said parking space availability of a surrounding area via said web browser prior to reserving and traveling to said at least one parking space.

20. The processor-readable medium of claim 15 wherein said code further comprises code to remotely and visually examine via said communications device, said at least one parking space for desirability, location, and a surrounding environment thereof to enhance customer satisfaction.

* * * * *